UNITED STATES PATENT OFFICE.

GEORGE M. MOWBRAY, OF TITUSVILLE, PENNSYLVANIA.

IMPROVED COMPOUND FOR PRIMING ELECTRIC FUSES.

Specification forming part of Letters Patent No. 96,465, dated November 2, 1869.

*To all whom it may concern:*

Be it known that I, GEORGE M. MOWBRAY, of Titusville, Crawford county, Pennsylvania, have invented a certain Compound for Priming Fuses to be Fired by Electricity, of which the following is a specification.

The nature of my invention consists in intimately mixing subphosphide of silver and subsulphide of silver with finely-divided chlorate of potash, and adding thereto sulphide of mercury and drying thoroughly.

The proportions of the ingredients that I find to answer very effectually are as follows: phosphorus, five (5) parts; sulphur, fifteen (15) parts; silver, one hundred (100) parts; mercury, twenty-five (25) parts; chlorate of potash, thirty (30) parts. I first combine the five parts of phosphorus and ten parts of the sulphur with the hundred parts of silver by fusing the same together. I next combine the remaining five parts of sulphur with the twenty-five of mercury. The silver compound is then powdered and passed through a sieve having meshes of about one hundred and twenty (120) to the square inch. The sulphide of mercury is reduced to a state of as fine division as possible. I next powder the chlorate of potash, and, first adding sufficient alcohol to cover the rest of the ingredients, I then introduce the subsulphide of silver and the subphosphide of silver and triturate in a mortar until, by the evaporation of the alcohol, the mixture becomes a pasty mass, which is then dried, returned to the mortar, and the sulphide of mercury is then added and the mixture thoroughly made of all the above ingredients. Finally the powder thus formed is dried and preserved from moisture for use. A grain of the above mixture confined between the discharging-points and a spark passed in the usual manner will ignite it with explosion and a vivid red flame.

The advantages that I find in the above composition as a priming for electrical fuses are that it is not so dangerous to handle as is the fulminate of mercury *per se*, or when mixed with precipitated copper, such being the composition of the electrical fuses used in the United States generally, while it is more sensitive in the proportion that silver is a better conductor than copper, or about twenty per cent.—say as one hundred to eighty—than the Abel fuse, consisting of the sulphide and phosphide of copper and chlorate of potash; and, finally, it is less subject to change or decomposition when exposed to sea air or kept for any length of time.

I claim as my invention—

The manufacture or preparation of a compound, which I denominate "Mowbray's safety-priming for electric fuses," of the ingredients in the proportions substantially as described, and for the purposes set forth.

GEO. M. MOWBRAY.

In presence of—
 WM. P. PORTER,
 C. W. VAN DEMARK.